United States Patent [19]
Gallo, Jr.

[11] Patent Number: 5,690,876
[45] Date of Patent: Nov. 25, 1997

[54] SYSTEM FOR CONTINUOUS PRODUCTION OF ROOFING SHAKES

[76] Inventor: Francis Anthony Gallo, Jr., 16135 Gleneagle Dr., Fountain Hills, Ariz. 85268

[21] Appl. No.: 279,398

[22] Filed: Jul. 25, 1994

[51] Int. Cl.$^6$ .............................. B29C 69/02; B29C 59/04
[52] U.S. Cl. .................. 264/151; 264/177.1; 264/177.2; 264/201.6; 264/284; 425/92; 425/106; 425/296; 425/304; 425/327; 425/335
[58] Field of Search ........................... 425/92, 102, 106, 425/296, 304, 327, 335, 337, 367, 373, 385; 264/148, 151, 167, 173.1, 177.1, 177.2, 210.6, 284

[56] References Cited

U.S. PATENT DOCUMENTS

| | | | |
|---|---|---|---|
| 1,236,144 | 8/1917 | Bryson | 425/106 |
| 2,010,425 | 8/1935 | Buczkowski | 425/106 |
| 2,446,782 | 8/1948 | Otis et al. | 425/92 |
| 2,619,675 | 12/1952 | Woolff | 425/106 |
| 3,636,147 | 1/1972 | Rowland | 264/284 |
| 4,017,230 | 4/1977 | Jakel | 425/356 |
| 4,420,295 | 12/1983 | Clear et al. | 425/92 |
| 4,941,949 | 7/1990 | Luszczak | 425/385 |
| 5,094,058 | 3/1992 | Slocum | 264/173.1 |
| 5,534,207 | 7/1996 | Burrus | 425/378.1 |

*Primary Examiner*—James P. Mackey
*Attorney, Agent, or Firm*—Harry M. Weiss; Jeffrey D. Moy; Harry M. Weiss & Associates, P. C.

[57] ABSTRACT

A system for the continuous production of asphalt-based roofing shakes which are tapered and embossed to resemble wood shakes in looks and function; and the shake made thereby. The continuous production system hot-mixes and extrudes the ingredients in a tapered layer on a conveyor belt for embossing and cutting. The system permits wood-shake type variety in size and appearance. The preferred shake includes perlite as a filler and chopped glass fibers as a reinforcer and may be internally colored.

8 Claims, 9 Drawing Sheets

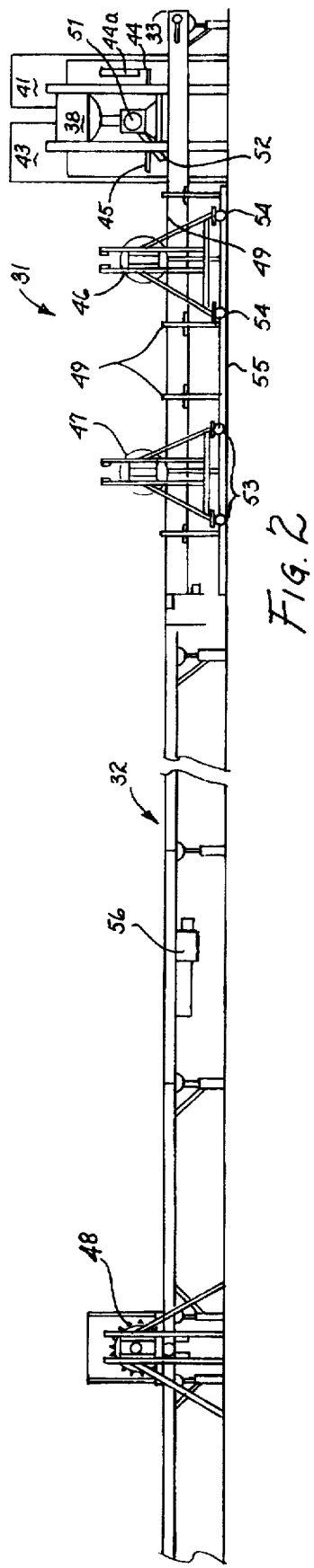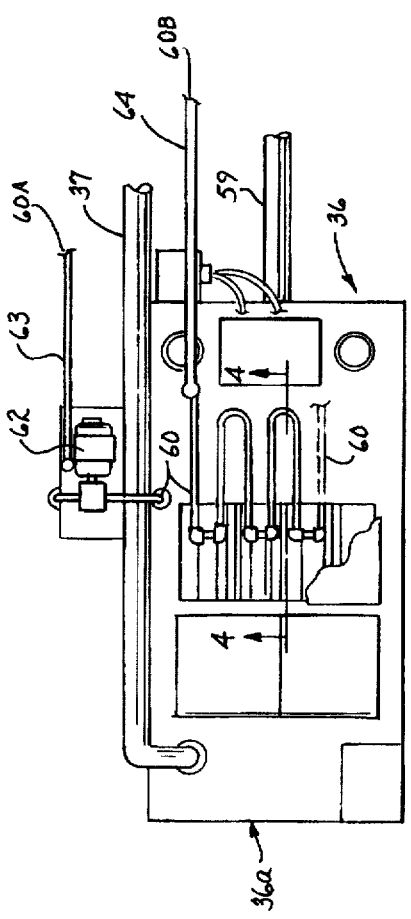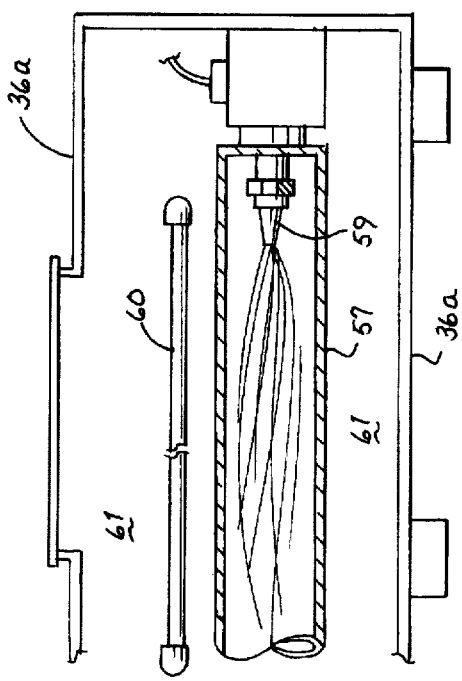

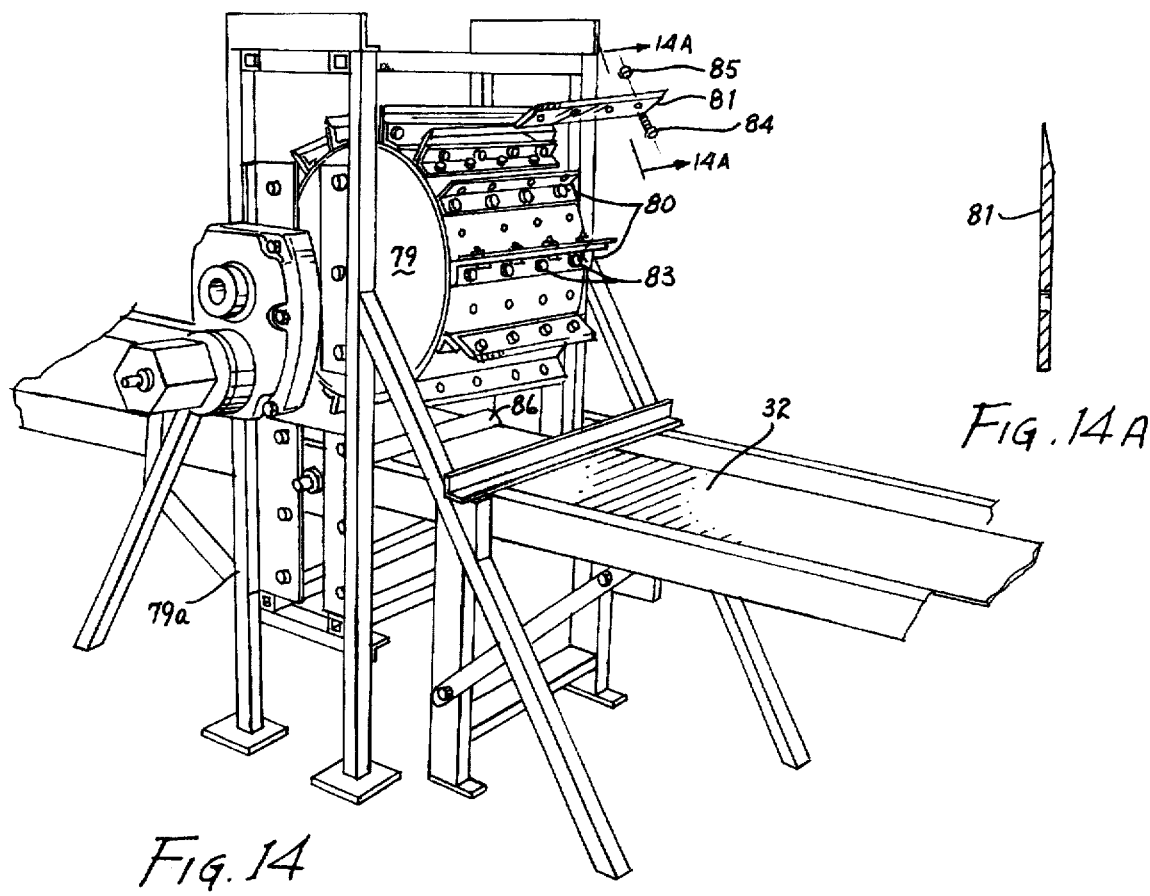
Fig. 14
Fig. 14A
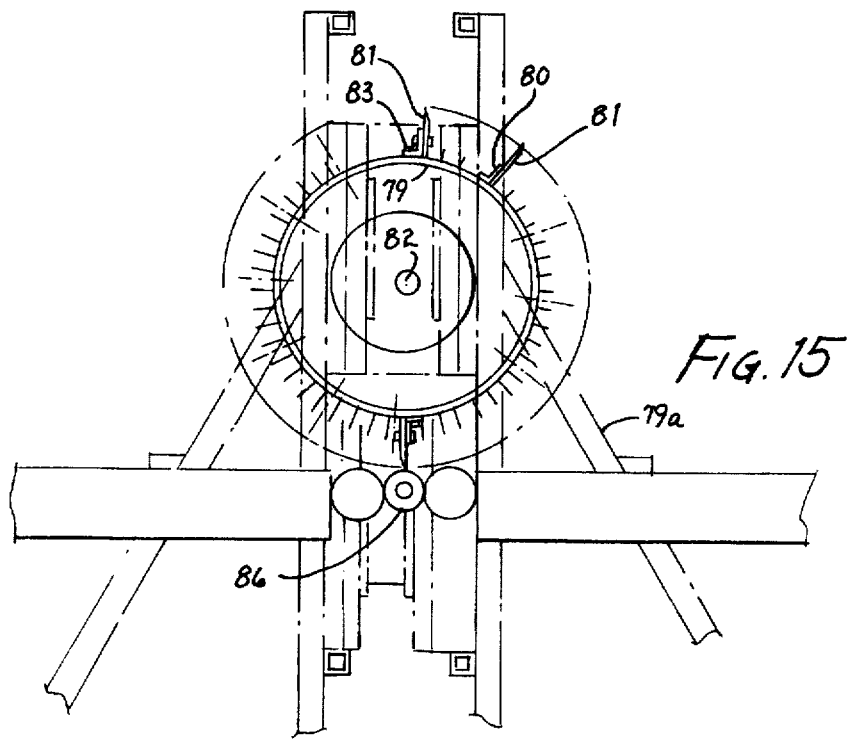
Fig. 15

SYSTEM FOR CONTINUOUS PRODUCTION OF ROOFING SHAKES

BACKGROUND OF THE INVENTION

1. Field of the Invention

This invention relates generally to the manufacture and construction of roofing shakes and shingles. More specifically, this invention provides a system for the continuous production of roofing shakes and shingles comprising thermoplastic materials, especially asphalt, and further provides a roofing shake/shingle made thereby.

2. Description of the Prior Art

Prior roofing shakes and shingles may be characterized by three distinct kinds of materials and distinct systems for making each kind of roofing, each kind of roofing having certain advantages and certain disadvantages. Concrete-type roofing tiles give good service and long life, but are expensive and heavy. Wood-type roofing shakes are attractive with adequate life, but are also expensive and very flammable. Thermoplastic-type roofing, as typified by asphalt shingles (e.g., those known as "3-Tab Roofing Shingles"), are the least expensive, are light, and are much less flammable than wood; but they are considered the least attractive. Because of overall cost considerations, asphalt roofing products are by far the most popular in worldwide use today.

Prior art asphalt shingles are manufactured essentially by pouring very hot (usually over (420 degrees Fahrenheit) heated asphalt material onto flat fiberglass continuous matting and cooling the material and then cutting it into roofing shingle shapes. Such high temperature in manufacturing eliminates the potentials of mixing the asphalt with certain other ingredients while hot; and so such other ingredients must be imbedded or laminated to the asphalt after the asphalt is cooled. Such processes produces inexpensive roofing, but each shingle is flat, single dimension (with no taper), and these flat shingles, when used in common "overlapping" roofing, do not fit tightly and tend to change shape and conform in unattractive ways.

An example of why wood-type roofing shakes are attractive is that they are, for the most part, manufactured with a taper along the length of the shake, so that when they are laid on the roof in overlapping fashion, they fit nicely and remain attractive for the life of the roof. Also, being made of a natural material, wood, each shake has a look and texture distinct from each other shake, which is accentuated by manufacturing such shakes in varying sizes and conformations.

Thus, for a considerable time period there has existed a need, to which the present invention is addressed, for the design and manufacture of a relatively inexpensive roofing product of the thermoplastic type having the advantages (but not the disadvantages) of wood-type roofing shakes, addressing the above-mentioned and other problems in an efficient, safe, cost-effective, combinatorial, creative, and operational manner.

OBJECTS OF THE INVENTION

Accordingly, it is an object of this invention to provide an efficient system and apparatus for the continuous production of roofing shakes comprising thermoplastic materials, especially asphalt, and further to provide a roofing shake made thereby. Another object is to provide a shake tapered as a wood shake, and to provide a continuous way to make such shakes. Moreover, it is an object of this invention to provide for obtaining great variability in the size, dimensions, and tapers in which shakes may be made according hereto in a single and continuous means of manufacture.

It is a further object of this invention to provide an improved asphalt-type roofing shake having the attractive "look" and other advantages of wood-type roofing shakes and to further provide an efficient novel system for the continuous production of such improved roofing shakes, thus overcoming the problems presented by the prior art.

It is a further object of this invention to provide, in an efficient continuous system for the production of such improved roofing shakes, for the attractiveness and usability of roofing shakes having an appropriate taper along their length and otherwise having the surface "look" and attractiveness of wood shake roofing, all in creative combination, multiple elements and functions which together overcome the problems presented by the prior art. Another object of this invention is to provide a combination of ingredients for the manufacture of tapered asphalt shakes which, in the preferred process of manufacture, provide each shake with a reinforcing integral matrix giving good torsional rigidity as well as good cross-sectional rigidity (without containing a fiberglass mat).

It is a further object of this invention to provide a novel and efficient method of manufacture of such improved roofing shakes. Yet another object of this invention is to provide an improved thermoplastic-type roofing shake having the shape, resilience, strength, usability, and attractiveness desired by the roofing industry. Yet another object is to be able to make use of asphalts with a high melting temperature so as to use embossings which maintain their shape in roofing uses for their useful life.

SUMMARY OF THE INVENTION

According to the foregoing objectives, this invention describes an improved system for the continuous manufacture of roofing shakes and describes an improved roofing shake made thereby and describes a novel roofing shake, all of which provide, in combination, elements and functions fulfilling all of said objectives.

Further, this invention provides, in a system for the continuous manufacture of roofing shakes, means for providing a supply of heated thermoplastic material; means for hot-mixing selected other shake ingredients with such heated thermoplastic material to provide heated shake material; means for continuously extruding such heated shake material (preferably onto conveyor-belt means) as a shake material layer; and means for cutting such shake material layer to provide roofing shakes. The present invention further includes, in such system for the continuous manufacture of roofing shakes, means for embossing the top of said shake material layer to provide varying embossing patterns on said shake material layer. There is further provided such a system wherein such heated thermoplastic material consists essentially of asphalt.

Also, there is provided such a system for producing asphalt-type shakes wherein selected other shake ingredients include a filler material, preferably perlite sized optimally, and a reinforcer material, preferably chopped glass fibers. The chopped glass fibers are preferably made of wound-fiber fiberglass strands and consist essentially of fibers from about ¾ inch long to about 1½ inches long. And, in such a system, such heated shake material includes the following materials within the following percentage ranges, by volume: asphalt, 70%–80%; perlite, 15%–25%; chopped glass fibers 3%–10%. And such a system includes means for extruding such shake material layer tapered in thickness in the direction of the width of such conveyor belt means.

In addition, the present invention includes in such a system means for embossing the top of such shake material layer, such means for embossing preferably comprising embossing drum means controllably angled from horizontal to match any such taper of such shake material layer. Such means for embossing preferably comprises two embossing stations along such conveyor belt means for providing varying embossing patterns on such shake material layer. Further preferred in such a system there is provided, along such conveyor belt means, prior to such embossing stations, means for spreading a thin layer of sand onto the top of such shake-material layer. And there is further preferably provided such a system wherein such heated shake material includes 5%–7% by volume of color pigment, such color pigment preferably consisting essentially of synthetic iron oxide pigment, about 0.60 micron in size.

According to the present invention, such a system is provided wherein such heated shake material is mixed at a temperature of about 300–350 degrees Fahrenheit and such heated material is then extruded at a temperature of about 240 degrees Fahrenheit, being continuously extruded onto such conveyor belt means. And such heated shake material is preferably under an extrusion pressure of from about 20 psi to about 50 psi when being continuously extruded onto such conveyor belt means.

This invention further preferably provides, in combination, in a system for the continuous manufacture of roofing shakes: heated vat means for providing a supply of heated asphalt; liquid-heating means for providing a supply of heated liquid for pipe-circulation, such liquid-heating means comprising pipes in such heated vat means for heating liquid circulating through such supply of heated asphalt; sand means for providing a supply of sand; perlite means for providing a supply of perlite; chopped-glass means for providing a supply of chopped glass fibers; color means for providing a supply of color pigment; mixer means for mixing shake ingredients to provide shake material; asphalt pipe means for transporting heated asphalt from such heated vat means to such mixer means; liquid pipe means for transporting heated liquid from such liquid heating means to such mixer means and for circulating such heated liquid through such mixer means to maintain heat therein; perlite transport means for transporting perlite from such perlite means to such mixer means; chopped-glass transport means for transporting chopped glass from such chopped-glass means to such mixer means; color-pigment transport means for transporting color pigment from such color means to such mixer means; composition means for controlling within desired ranges the composition of shake ingredients to be mixed by such mixer means, such composition means controlling the following shake ingredients within the following percentage ranges, by volume, to wit, asphalt, 70%–80%, perlite, 15%–25%, chopped glass fibers 3%–10%, color pigment 5%–7%; conveyor-belt means for providing a conveyor belt for continuous shake manufacture; first sand spreader means for spreading a thin layer of sand directly on said conveyor belt as a base and releaser for shake material; first sand transport means for transporting sand from such sand means to such first sand spreader means; extrusion means for receiving such shake material from such mixer means and for extruding a shake-material layer onto such conveyor belt, such extruder means including extruder nozzle means elongated substantially parallel to such conveyor belt, such extruder nozzle means including guillotine means for providing desired dimensional control for extruding such shake material layer tapered in thickness in the direction of the width of such conveyor belt; extruder cooling means for cooling such shake material in such extruder means; second sand spreader means for spreading a thin layer of sand onto the top of such shake-material layer; second sand transport means for transporting sand from such sand means to such second sand spreader means; shake cooling means for cooling such shake material layer; conveyor-belt narrowing means for setting the effective width of such conveyor belt to match the width of such extruded shake material layer; shake embossing means for embossing the top of such shake material layer, such shake embossing means comprising embossing drum means controllably angled from horizontal to match any such taper of such shake material layer, such shake embossing means comprising two embossing stations along such conveyor belt and means to variably control the distance between such stations to provide varying embossing patterns on such shake material layer; and shake cutting means comprising a cutting station along such conveyor belt for cutting such shake material layer into shakes of controllably varying widths.

In addition, this invention provides, in a method for the continuous manufacture of roofing shakes, the steps of: providing a supply of heated thermoplastic material; hot-mixing selected other shake ingredients with such heated thermoplastic material to provide heated shake material; continuously extruding such heated shake material onto conveyor-belt means as a shake material layer; and cutting such shake material layer to provide roofing shakes. Preferably, in such method, such extruding step comprises extruding such shake material layer tapered in thickness in the direction of the width of such conveyor belt means. And this invention further provides a roofing shake manufactured by such steps; and preferably wherein such heated shake material includes the following materials within the following percentage ranges, by volume: asphalt, 70%–80%; perlite, 15%–25%; chopped glass fibers 3%–10%; and preferably wherein such heated shake material is under an extrusion pressure of from about 20 psi (pounds per square inch) to about 50 psi when being continuously extruded onto such conveyor belt means.

Further, this invention provides a roofing shake smoothly tapered through the length of such roofing shake, such roofing shake comprising the following roofing shake materials within the following percentage ranges, by volume, to wit, asphalt, 70%–80%; perlite, 15%–25%; chopped glass fibers 3%–10%; and most of such chopped glass fibers being essentially aligned in the direction of the width of such roofing shake. And this invention further provides such a roofing shake wherein such roofing shake is smoothly tapered through the length of such roofing shake, from a thickness of about 1¼ inches to ⅜ inches at a thicker end to a thickness of about ⅜ inches to ⅛" at a thinner end. There is further provided such a roofing shake wherein such shake is sized and embossed so as to resemble a wood shake; and wherein such shake is colored to resemble a wood shake. Further provided is a roofing shake wherein the coloring of such shake is in a color pigment homogeneously mixed in such shake materials. Further provided is a roofing shake wherein such shake material includes 5%–7% by volume of such color pigment; and further wherein such color pigment consists essentially of synthetic iron oxide pigment, about 0.60 micron in size.

BRIEF DESCRIPTION OF THE DRAWINGS

FIG. 2 is a partial front view, broken as shown, taken through the section 2—2 of FIG. 1, of the illustrated preferred embodiment of the present invention.

FIG. 3 is a top view, partially in section, of the heated vat means of the illustrated preferred embodiment of the present invention.

FIG. 4 is a partial front view, through the section 4—4 of FIG. 3., of an interior part of the heated vat means of the illustrated preferred embodiment of the present invention.

FIG. 14 is a perspective view showing the shake cutting means of the described preferred embodiment of the system of the present invention.

FIG. 14A is a sectional view through the section A—A of FIG. 14, showing the cross-section of one of the cutting elements of the shake cutting means of the described preferred embodiment of the system of the present invention.

FIG. 15 is a front view, partially in section, showing the shake cutting means of the described preferred embodiment of the system of the present invention.

DETAILED DESCRIPTION

Figure 1:
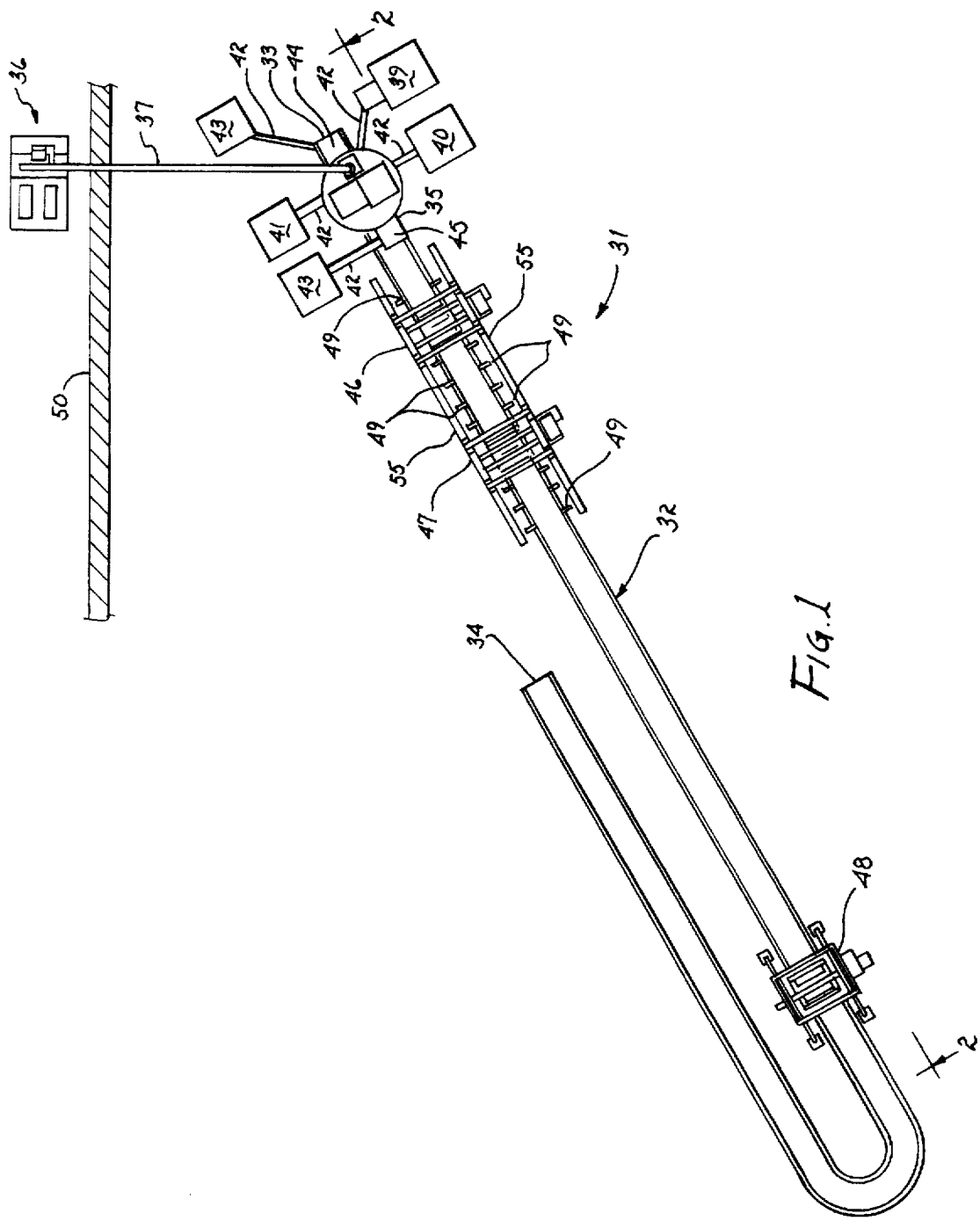
FIG. 1 is a top view from above a preferred embodiment of the system of the present invention, showing a preferred general arrangement of the parts and subsystems of such preferred embodiment of the system of the present invention.

FIG. 1 is a top view looking down on a preferred embodiment of the system 31 of the present invention, showing a preferred general arrangement of the parts and subsystems of such preferred embodiment. The purpose of system 31 is the continuous production of roofing shakes. Such continuity is achieved in part by use of a motorized conveyor belt 32 (of standard construction except where otherwise noted). Conveyor belt means 32 moves items placed thereon horizontally along the belt 32 from its beginning 33 to its end 34. Heated shake material (not shown in FIG. 1) is mixed and extruded onto belt 32 as a layer of shake material (not shown in FIG. 1) at extrusion location 35.

Heated vat means 36 contains a supply of heated asphalt (about 350–400 degrees Fahrenheit), a shake ingredient, which, according to the system of the present invention, is controllably pumped through asphalt pipe 37 into mixer means 38. Other shake ingredients are controllably deposited into mixer means 38 from various hoppers. A highly preferred filler material is perlite, preferably sized so that, based on a Tyler screen analysis, there is about 40% retained on a size 50 screen, also using screen sizes 28, 35, 65, 80,100, 200, and pan. With reference to FIG. 1, perlite hopper 39 contains a supply of perlite which is controllably deposited in mixer means 38 by way of a Galilean screw 42 which transports the perlite from the bottom of hopper 39 to the top (entrance) of mixer means 38.

A highly preferred reinforcer is of the type of chopped strand fiberglass fiber containing up to about 40 individual strands held together with a thermoplastic coating so that, after the fibers are introduced to the hot asphalt and the coating is oxidized or melted off, the fibers will unwind in the reverse of the machine-wound direction (binding similarly to rebar in concrete) as the unwinding grips the perlite filler and asphalt binder ovally encapsulated in their fibers, thus giving optimum torsional and longitudinal strength. The chopped glass fibers are preferably made of wound-fiber fiberglass strands and consist essentially of fibers from about ¾ inch long to about 1½ inches long. Preferred are the same type of chopped glass fibers used in stucco and asphalt emulsions (as supplied, e.g., by PPG (TM) and Pilkenton of England (TM).

Similarly as with the perlite, chopped-glass-fiber hopper 40 contains a supply of chopped glass fibers which is controllably deposited in mixer means 38 by way of a Galilean screw 42 which transports the chopped glass fibers from the bottom of hopper 40 to the top (entrance) of mixer means 38. Similarly, for optional coloring of roofing shakes according to the present invention, color pigment hopper 41 contains a supply of color pigment which is controllably deposited in mixer means 38 by way of a Galilean screw 42 which transports the color pigment from the bottom of hopper 41 to the top (entrance) of mixer means 38. Sand hoppers 43 supply sand controllably to sand spreaders 44 and 45 located over belt 32.

When all of the shake ingredients have been hot-mixed (at a temperature of about 350degrees) and extruded (at a temperature of about 240 degrees Fahrenheit, but never more than about 300 degrees Fahrenheit) as a shake material layer onto belt 32, the top of the shake material layer is embossed while passing under embossing drums 46 and 47. Then the shake material layer is cut into shakes when passing through shake cutting means 48. Water spray nozzles 49 accelerate cooling of the shake material layer before and during embossing. For safety and efficiency, it is preferred that heated vat means 36 be outdoors, separated from the rest of system 31 by building wall 50. Besides asphalt pipe 37, another pipe, a hot oil pipe 60 (not shown in FIG. 1), comes from heated vat means 36 through wall 50 to mixer means 38 for the purpose of supplying heat to mixer means 38 (and then for the purpose of reduced heat during the extruding process). The hot oil is then piped back to heated vat means 36 to be re-heated and re-circulated to mixer means 38, etc.

FIG. 2 is a partial front view, broken as shown, taken through the section 2—2 of FIG. 1, of the illustrated preferred embodiment of the present invention. With reference to FIG. 2, the hot shake material, after mixing in mixer means 38, proceeds to extrusion means 51, from where the hot shake material is extruded through extrusion nozzle 52 to form a shake material layer on belt 32, motor driven by motor means 56. Vibratory sand spreader 44 (vibrated by vibrator 44a) places a thin coating of sand on belt 32 to act as a release agent for the shake material layer to be deposited thereon. Vibratory sand spreader 45 (vibrated by vibrator 45a) spreads a thin layer of sand on top of the extruded shake material layer for most efficient cooling, embossing, and surface attractiveness. Embossing drums 46 and 47 ride separately on wheels 53 and 54, respectively, which ride on track 55, permitting the locations of and the distance between the two embossing drums 46 and 47 to be varied at will, thus making the embossing pattern on the shake material layer infinitely varying by varying the superimposition placement of the pattern on embossing drum 47 upon the pattern from embossing drum 46. This arrangement also permits varying the distance, and thus the cooling potential, that the shake material layer may be cooled from its point of extrusion 35 to the first embossing drum 46.

The heated vat means 36 is shown most clearly in FIGS. 3 and 4. FIG. 3 is a top view, partially in section, of the heated vat means 36 of the illustrated preferred embodiment of the present invention. The vat means 36, for containing and heating a supply of asphalt 61 (at a temperature of about 350–400 degrees Fahrenheit), comprises a tub or vat 36a which contains a plurality of heating tubes 57 for gas or similar heating, including appropriate burners 58 and served by gas line 59. Vat 36a also contains portions of a recirculating pipe line 60 for hot oil. The hot oil in pipe line 60 is heated by the hot asphalt 61 in the vat (to a temperature of about 350–400 degrees Fahrenheit) and then transported by pumping with pump 62 through an exit hot oil insulated pipe 63 by way of supply hot oil pipeline 60A to hot oil pipe portions 60C in the interior of mixer means 38, where it works to maintain an appropriate temperature (about 350 degrees Fahrenheit) for mixing the asphalt with the other shake ingredients. Then, the hot oil (at a reduced temperature of about 320–350 degrees Fahrenheit) is piped through portions of pipe 60B from mixer means 38 to be circulated through heat-exchange jacket 67 of extrusion means 51. Then the hot oil (at a further reduced temperature of about 300–320 degrees) is piped through portions of pipe 60B through heat-exchange jacket 68 of extrusion nozzle 52. [The preferred temperature of the asphalt when extruded from extrusion nozzle 52 is about 240 degrees Fahrenheit, but never more than 300 degrees Fahrenheit.] Then the hot oil returns to the vat 36a by way of pipe 60B and the entrance pipe 64 to once again be heated by flowing through the pipe 60 going through the hot asphalt 61.

Figure 5:
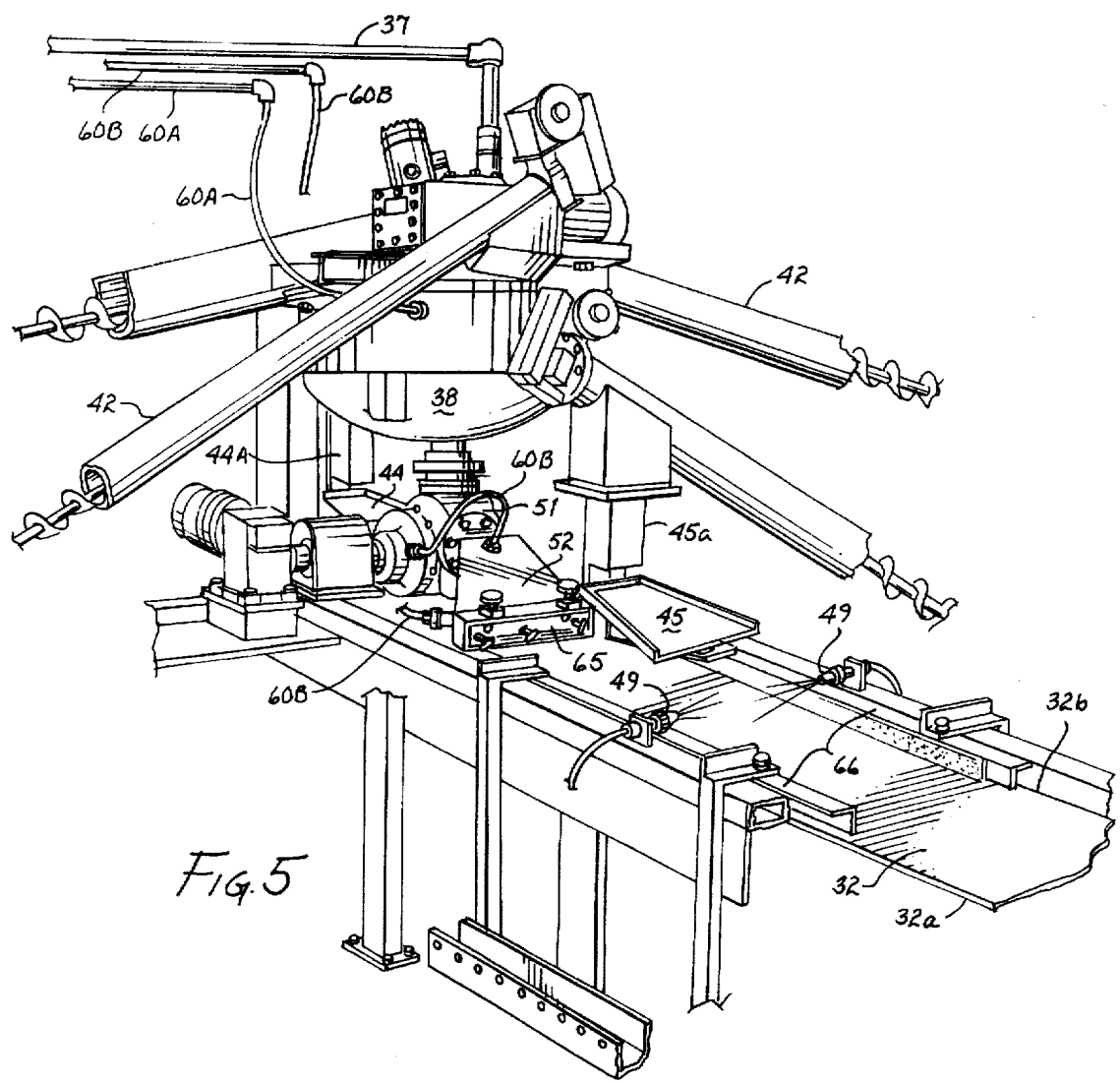
FIG. 5 is a pictorial perspective view, generally from the back, partially in section, illustrating the described preferred embodiment of the system of the present invention at the extrusion end of the conveyor belt means thereof.

FIG. 5 is a pictorial perspective view, generally from the back, partially in section, illustrating the described preferred embodiment of the system of the present invention at the beginning end 33 of the conveyor belt means 32 thereof. With particular reference to FIG. 5, the mixer means 38 receives hot asphalt (at a temperature of about 350–400 degrees Fahrenheit) from the insulated pipeline 37. Hot oil lines 60 permit hot oil circulation within the mixer means 38 to maintain an appropriate temperature for mixing (about 350 degrees Fahrenheit). Other shake ingredients come into the mixer means 38 by way of Galilean-screw transports 42, which, in the preferred embodiment, carry perlite, chopped glass fibers, and color pigment. These other ingredients are thoroughly mixed in mixer means 38 to result in the hot shake material (not shown); and then this material goes to extrusion means 51 where it is pressurized and extruded (at a temperature of about 240 degrees Fahrenheit, but never more than about 300 degrees Fahrenheit) through extrusion nozzle 52. Guillotine means 65 is affixed to the extrusion nozzle 52 and permits accurate setting of the tapered dimensions of the shake material layer being extruded.

FIG. 5 also most clearly shows the first vibratory sand spreader 44 and the second vibratory sand spreader 45 (and their respective vibrators 44a and 45a), the water spray nozzles 49 of the cooling means used to cool the extruded shake material layer, and the narrowing means 66 to set the effective width of belt means 32 at the width of shake material being extruded. It is preferred that conveyor belt 32, in standard ways, be set up in the area of the extrusion to slant or tilt downward across the width of belt 32 so that (see FIG. 5) the side 32a is about 12 degrees lower than the side 32b. This uses gravity to assist in maintenance of the preferred taper in the shake material layer since the thicker side of the extruded shake material layer is somewhat (i.e., 12 degrees) lower than the thinner side and any thermoplastic flow will be somewhat controlled to maintain the said taper.

Figure 6:
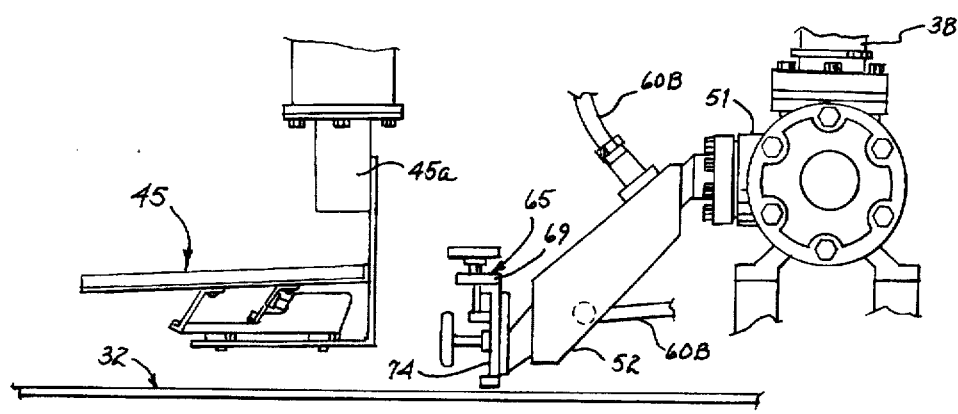
FIG. 6 is a partial front view illustrating the described preferred embodiment of the system of the present invention at the location of the extrusion means thereof.
Figure 7:
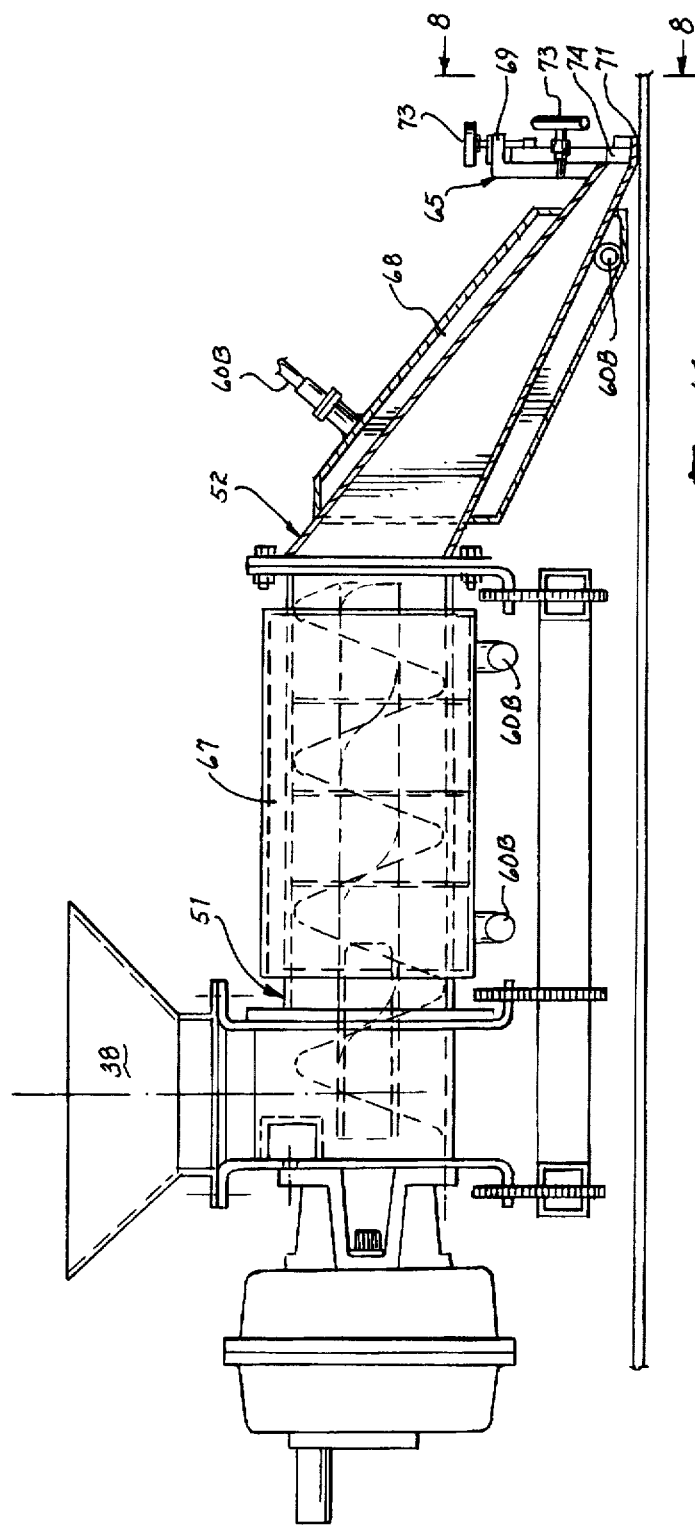
FIG. 7 is a partial back view, partially in section, further illustrating the extrusion means of the described preferred embodiment of the system of the present invention.
Figure 8:
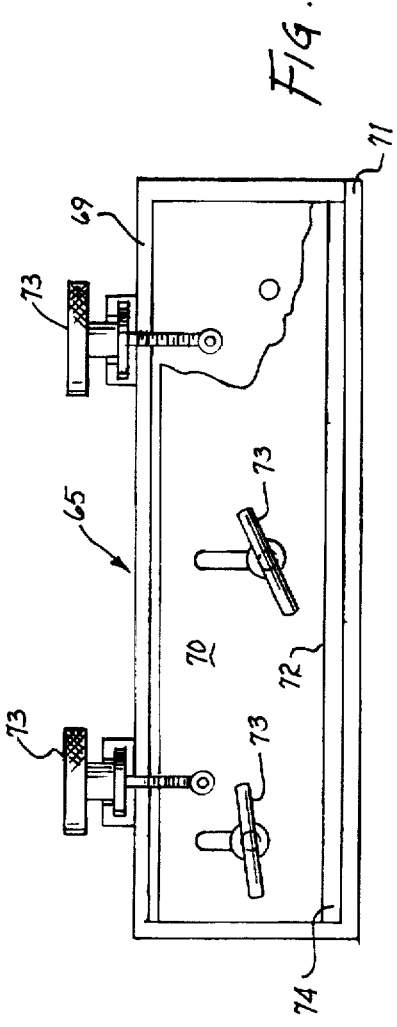
FIG. 8 is side view, partially in section, through the section 8—8 of FIG. 7, further illustrating the guillotine means of the extrusion means of the described preferred embodiment of the system of the present invention.

With particular reference to FIGS. 6, 7, and 8, the details of the extrusion means 51 are best shown. When the shake material ingredients have been hot-mixed in mixer means 38, the hot shake material should be cooled, but not too quickly. Extrusion means 51 has a hot oil heat-exchange jacket 67 around it to cool the hot shake material during build-up of extrusion pressure; and extrusion nozzle 52 has a second hot oil heat-exchange jacket 68 around the nozzle 52 to further cool (but not too quickly) the hot shake material just before extrusion. Extrusion means 51 may be screw means (illustrated), or diaphragm means or such other means as may be or become known in the art. It is noted that closures of all of the vats and transports herein is as mandated by the sealing requirements under EPA regulations.

With particular reference to FIG. 8, guillotine means 65 comprises frame 69, which is firmly attached in any known manner to extrusion nozzle 52, to provide a vertical support for plate 70, which is relocatably and firmly placed (by adjustable supports 73) against frame 69 in the position desired for extrusion between the bottom 71 of extrusion nozzle 52 and the bottom 72 of guillotine plate 70. By appropriately placing plate 70 at an angle, the extrusion exit 74, which sets the section shape of the extruded layer of shake material, may be set for the tapered shape shown in FIG. 8 (tapered extrusion exit 74) or other desired tapered shape (see FIG. 18).

Figure 10:
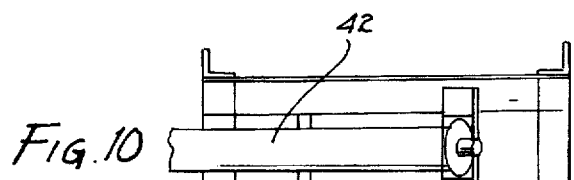
FIG. 10 is a partial top view of the sand spreader means area of FIG. 9.
Figure 9:
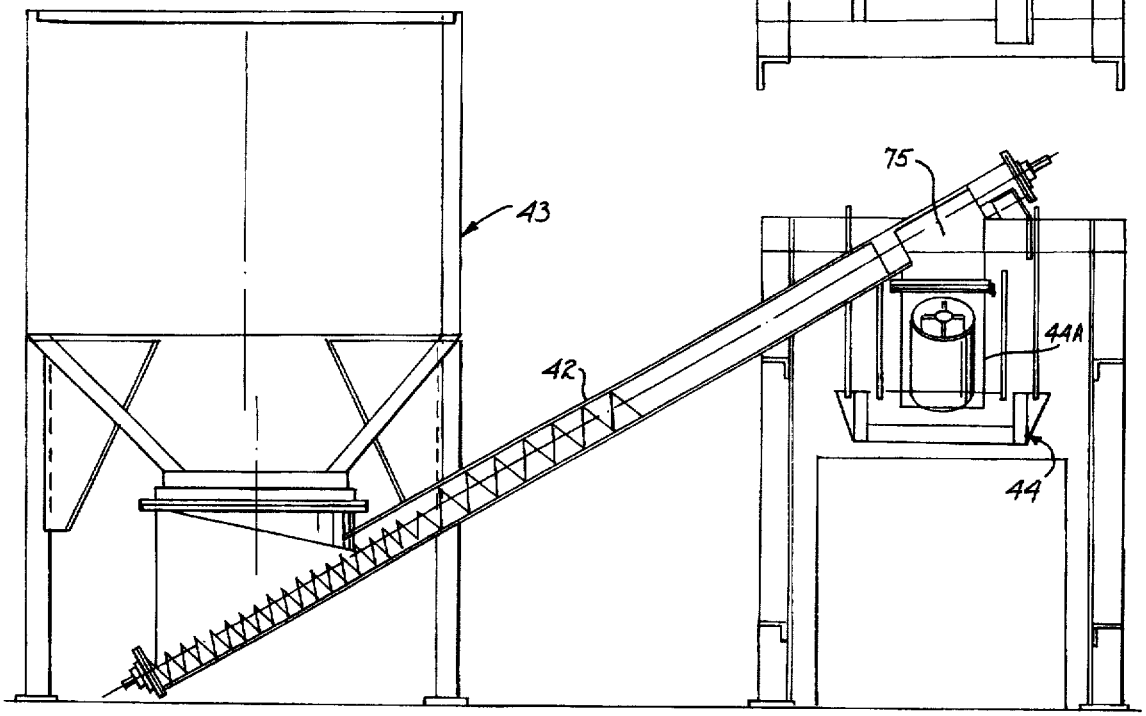
FIG. 9 is a plan view, partially in section, showing a representative means for transporting sand from a sand hopper to the sand spreader means of the described preferred embodiment of the system of the present invention.

FIGS. 9, 10, 11, 12, and 13 best illustrate the operation of the mixer means 38 and ways to transport the shake ingredients to the mixer means 38, as well as illustrating the transport of sand to the sand spreader means 44 and 45. FIG. 9 and 10 illustrate a representative means for transporting sand from a sand hopper 43 to the sand spreader means 44 (or to the sand spreader means 45) of the described preferred embodiment of the system of the present invention. Hopper 43 is constructed to feed its contents, sand, into a motorized transport means (a Galilean-screw transport means 42 is illustrated) to carry the sand to the vibratory sand spreader means 44 (including vibrator 44a) for deposit therein, said sand moving from the opening 75 near the top of the Galilean screw 42 into the vibratory sand spreader means 44. [A similar sand hopper 43 transports sand to vibratory sand spreader 45 (including vibrator 45a).]

Figure 11:
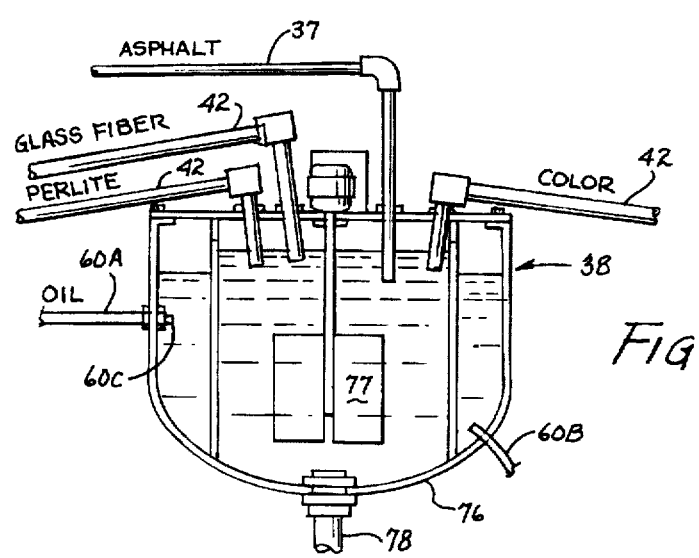
FIG. 11 is side view, partially in section, of the mixer means of the described preferred embodiment of the system of the present invention.
Figure 12:
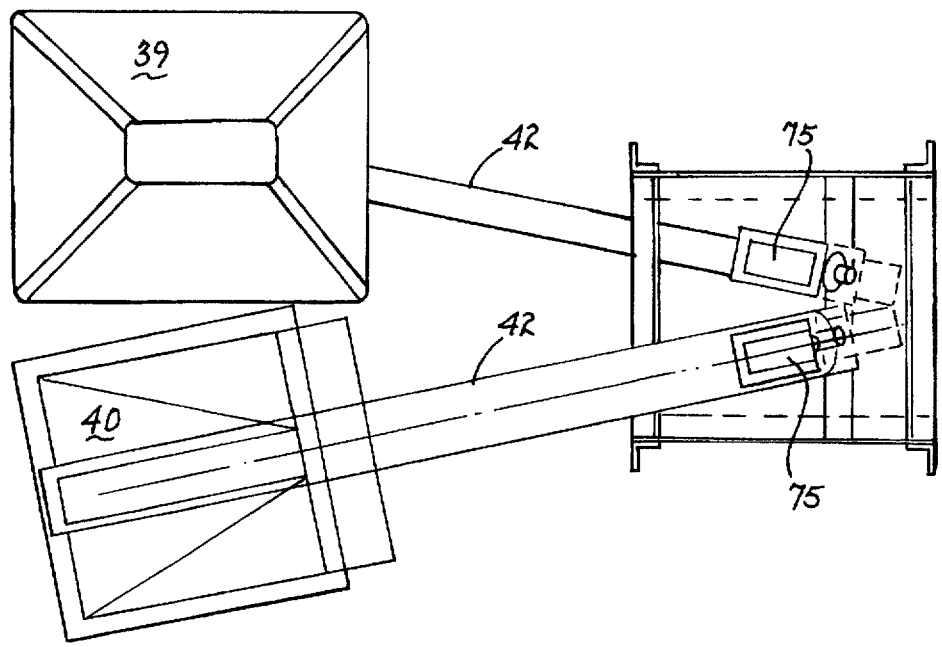
FIG. 12 is top view of the means for transporting various ingredients from ingredients hoppers to the mixer means, in the described preferred embodiment of the system of the present invention.
Figure 13:
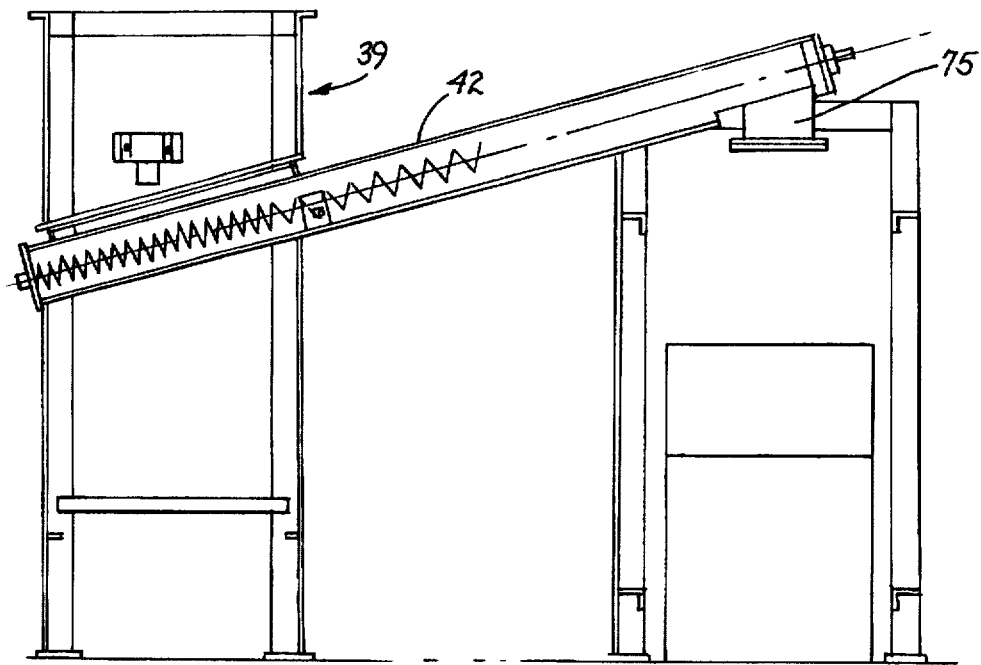
FIG. 13 is a side view, partially in section, of the ingredients transport means of the described preferred embodiment of the system of the present invention.

With particular reference to FIG. 11, there is illustrated a cutaway of the interior of the quasi-cylindrical mixer means 38. The exact configuration of the mixer means 38 is not critical, but it is important to get a good mix and to control the entry of ingredients in such well-known manners as will maintain the hot shake material in mixer means 38 within the appropriate percentage limits for each ingredient. Hot asphalt enters the mixing tub 76 of mixer means 38 at the top middle of tub 76 by way of asphalt pipe 37. The other ingredients enter tub 76 at the top by way of their respective Galilean-screw transports 42. Hot oil from pipe 60A serves to maintain the temperature of the shake material in tub 76 at about 350 degrees Fahrenheit. Motorized paddle 77 mixes the shake material ingredients preparatory to the hot shake material leaving mixer means 38 to be delivered to extrusion means 51 by way of mixer outlet 78. FIGS. 12 and 13 illustrate in outline form the transport of a shake ingredient to the mixer means 38. Hopper 39 (for example, holding perlite) is constructed to feed its contents, a shake ingredient, into a motorized transport means (a Galilean-screw transport means 42 is illustrated) to carry the shake ingredient to the mixer means 38 for deposit therein, said ingredient moving from the opening 75 near the top of the Galilean screw 42 into the mixer means 38. Similarly, hopper 40 (for example, holding chopped glass fiber) is constructed to feed its contents, a shake ingredient, into a motorized transport means (a Galilean-screw transport means 42 is illustrated) to carry the shake ingredient to the mixer means 38 for deposit therein, said ingredient moving from an opening 75 near the top of a Galilean screw 42 into the mixer means 38.

FIGS. 14, 14A, and 15 best illustrate the shake cutting means of the described preferred embodiment of the present invention. A frame 79a rotatably supports rotatable cutter drum 79. Cutter drum 79, which may be motorized, contains, mounted on the outer surface of drum 79, a plurality of cutter blade holders 80, mounted every few inches along drum 79, parallel to each other so as to be able to receive a cutter blade 81 as desired by the user. This arrangement enables the user to determine the width of the shakes which will be cut; and, by varying the spacing of cutter blades 81 around drum 79, even enables the user to cut a variety of shake widths in a continuous operation. The axis 82 of drum 79 is parallel to the conveyor belt means 32; and the cutter blades 81 which are in place mounted on drum 79 will cut the shake material layer moving along conveyor belt 32 perpendicular to the direction of motion of belt 32. Even though the described shake material layer is tapered to produce tapered shakes, the drum 79 need not be tilted and will cut a tapered shake material layer cleanly and clear through against cutting board 86 (cylindrical and rotatable) even when the drum axis 82 and cutting board 86 are maintained parallel to the conveyor belt 32. Each holder 80 may be attached to drum 79 by bolts 83, as shown; and each cutter blade 81 may be attached to each holder 80 by matched bolts 84 and nuts 85, as shown.

Figure 16:
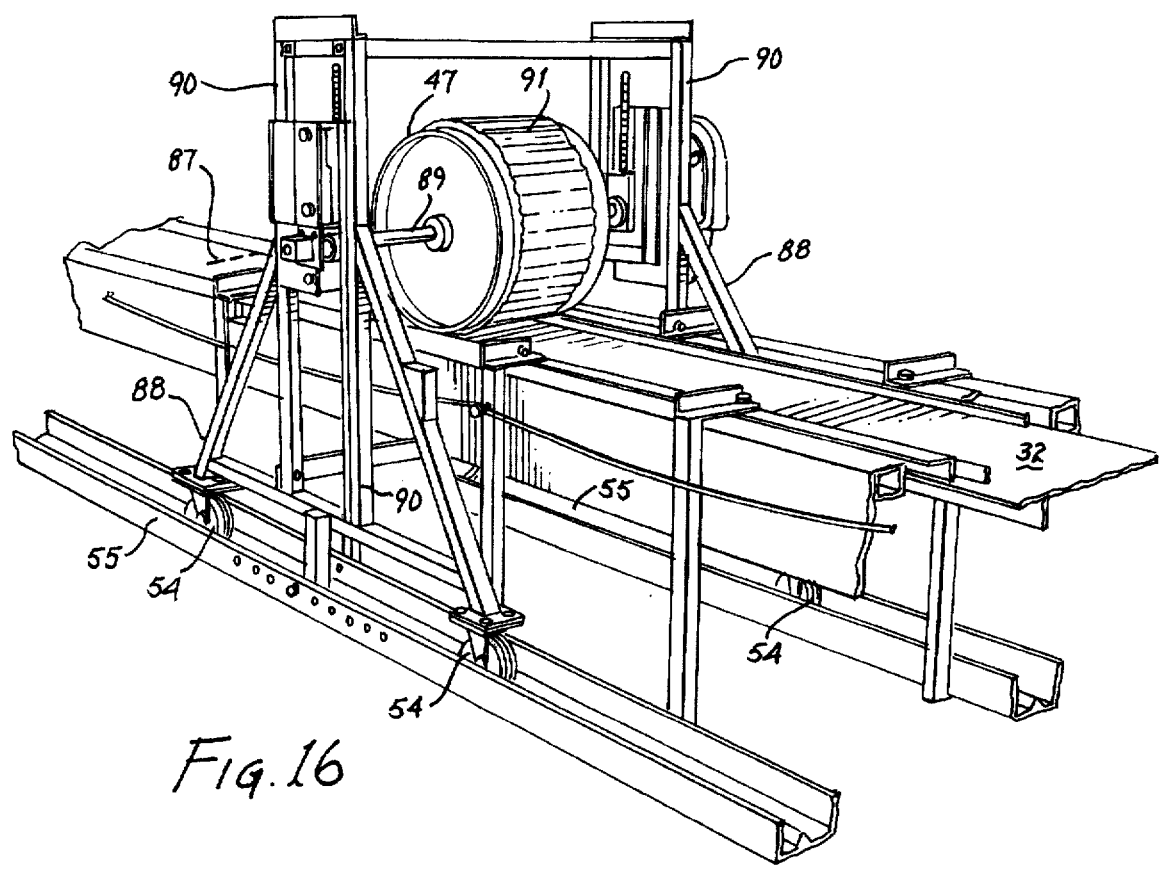
FIG. 16 is a perspective view illustrating a station of the embossing means of the described preferred embodiment of the system of the present invention.

FIG. 16 best illustrates the embossing means of the described preferred embodiment of the present invention. Embossing drum 47 having thereon embossing pattern 91 is rotatably mounted about drum axis 87. Embossing frame 88 supports drum 47 above conveyor belt 32 and is mounted on wheels 54 which ride on tracks 55 positioned to keep drum 47 in line above conveyor belt 32, yet permit movement of drum 47 along conveyor belt 32 in either direction to alter the distance between drum 47 and a nearby other similar embossing drum 46 (see FIG. 1). Spindle 89, upon which drum 47 is mounted, is situated along axis 87. Spindle 89 may be motor-driven and is mounted in vertical guides 90 so that the vertical height and tilt-from-horizontal of drum 47 may be adjusted as either end of spindle 89 is adjustably raised or lowered in its respective guide 90 in a well-known manner. The tilt of axis 87 which is preferred for best embossing results is equal to the taper set (by guillotine means 65) for the shake material layer passing under the embossing drum 47 on conveyor belt 32. In this way, the pattern embossed on this shake material layer will be pressed somewhat equally, if that is desired, along the taper of this shake material layer. It is preferred, in setting the tilt of axis 87, to ignore any slant of the conveyor belt 32 (e.g., the 12 degrees previously mentioned).

Figure 17:
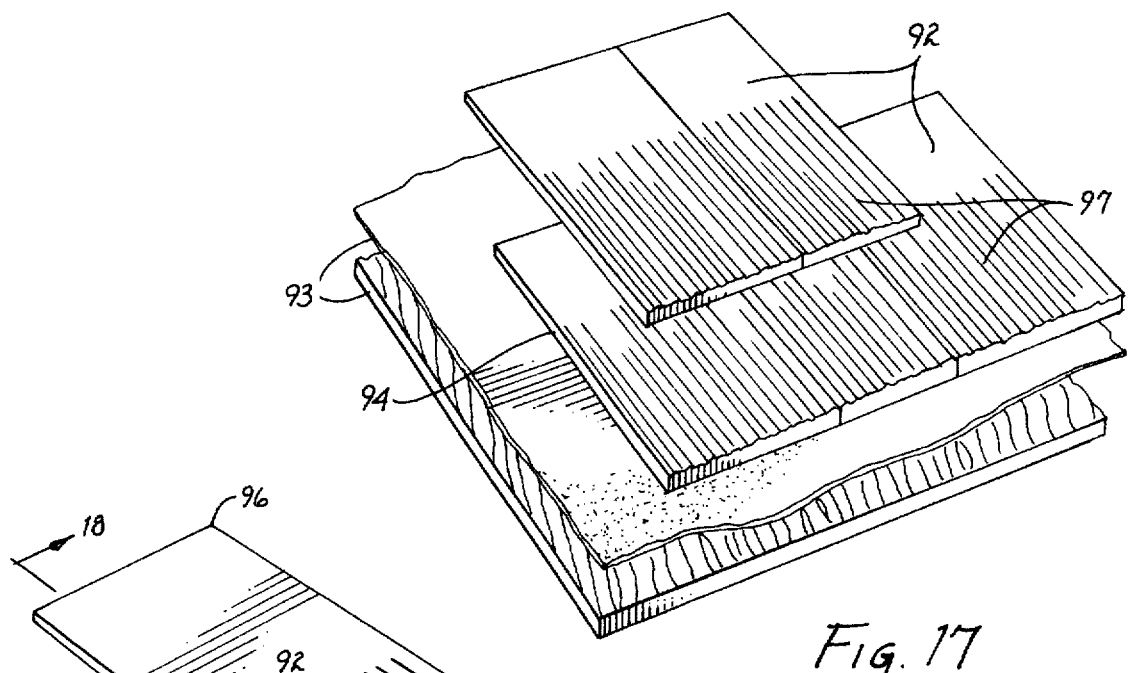
FIG. 17 is a perspective view illustrating how the roofing shakes of the present invention are normally used.
Figure 17A:
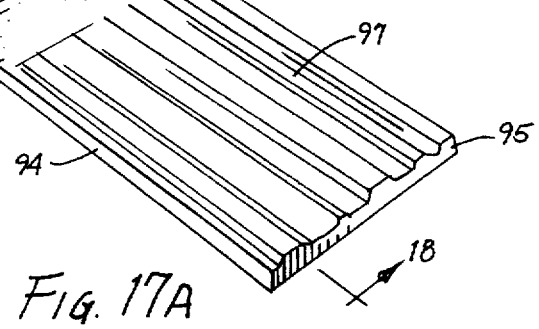
FIG. 17A is a perspective view of a preferred embodiment of a roofing shake of the present invention.
Figure 18:
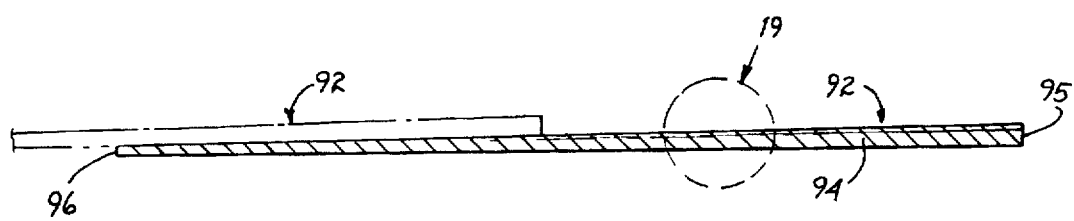
FIG. 18 is a sectional view, through section 2A—2A of FIG. 17A, of the described preferred embodiment of a roofing shake of the present invention (and showing its relative placement with an overlying shake when in normal use).

FIGS. 17, 17A, 18, and 19 best illustrate the roofing shake 92 of the described preferred embodiment of the present invention. As shown in FIGS. 17 and 18, shakes 92 are normally placed in overlapping arrangement with adjacent shakes 92, and they are placed on top of underlying roofing layers or sheets 93 in a well-known fashion in the art of wood shake roofing. The shakes 92 of the present invention, sized and embossed (and colored if desired) so as to resemble a wood shake, may be used in just the same way. It is noted that the tapered cross-section 94 of these shakes 92 permits the snugness and appearance delivered by wood shakes when properly laid. Most of the time users will desire shakes more in the shape of the shake 92 illustrated in FIG. 17A, that is, having a length of about 17 inches to about 22 inches and varying widths usually of from about 3 inches to well over 6 inches. Note that the shake 92 illustrated in FIG. 17a has been embossed with a pattern 97 (a matching "negative" of the combined embossing pattern 91 on embossing drum 47 and the pattern on drum 46) on its upper surface only along part of its length for better installation, since the narrower portion of each shake 92 is hidden by overlying shakes 92 when installed in a roof. The tapered cross-section 94 of shake 92, as best shown in FIGS. 17A and 18, represents exactly the cross-sectional shape and width of the extruded shake material layer from which shake 92 is cut. Such layer width and shake 92 are normally about ½ inch thick at the thicker end 95 of the taper and about ⅛ inch thick at the thinner end 96 of the taper.

Figure 19:
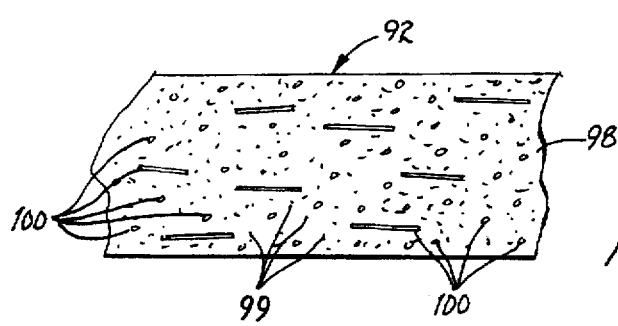
FIG. 19 is an expanded representation of the cross-sectional area denoted as "3A" on FIG. 18.

FIG. 19 is an expanded partial illustration of the cross-sectional area denoted as "3A" on FIG. 18, and depicts the approximate make-up of shake 92. Asphalt 98 has embedded throughout therein bits of perlite 99 and strands of chopped glass fiber 100. Most of the strands of chopped glass fiber 100 are aligned along the width of shake 92 (the direction of extrusion in manufacture) and thus their lengths are not visible. As shown, some of the glass fibers have other alignments, and there is overall created a matrix of glass fibers not unlike a reinforcing mat throughout shake 92.

It is noted that, with respect to the flammability of the roofing shake 92 of the present invention, the high volume of perlite and of fiberglass fibers and their interaction assists the shake 92 to be relatively non-flowable when heated. The shake 92 resists flowing in that, as the asphalt reaches flash, the expanded binders act as a holding screen to hold the ingredients in place while it they paraffinates like charcoal into a solid mass. It is further noted that the shakes 92 of the present invention can be hand cut, hand nailed, pneumatically nailed, or stapled. And, since asphalt is normally exempt from laws about water-absorption or degradation due to freezing, thawing, or the like, there are no geographical limitations as to cold climates.

Further advantages of applicant's invention will be apparent to those skilled in the art from the above descriptions and the below claims.

What is claimed is:

1. In a system for the continuous manufacture of roofing shakes:
   a. means for providing a supply of heated thermoplastic material;
   b. means for hot-mixing selected other shake ingredients with said heated thermoplastic material to provide heated shake material;
   c. means for continuously extruding said heated shake material as a shake material layer;
   d. conveyor-belt means for carrying said heated shake material;
   e. at least two shake embossing means located along said conveyor-belt means for embossing a top surface portion of said shake material layer to provide varying embossing patterns on said shake material layer;
   e. means to variably control the location of at least one of said shake embossing means along said conveyor-belt means; and
   f. means for cutting said shake material layer to provide roofing shakes.

2. A system according to claim 1 including:
   a. liquid heating means for providing a supply of heated liquid; and
   b. liquid pipe means for continuously circulating said heated liquid to said means for providing a supply of heated thermoplastic material, to said means for hot-mixing said selected other shake ingredients with said heated thermoplastic material and to said means for continuously extruding said heated shake material onto said conveyor-belt means as said shake material layer.

3. A system according to claim 1 including:
   a. means for continuously extruding said shake material layer tapered in thickness in the direction of the width of said conveyor-belt means; and
   b. wherein one side of said conveyor-belt means is lower than the other side, thereby providing a slant to lower a thicker end of said shake material layer.

4. In a system for the continuous manufacture of roofing shakes:
   a. heated vat means for providing a supply of heated asphalt;
   b. liquid-heating means for providing a supply of heated liquid for pipe-circulation,
      i. said liquid-heating means comprising pipes in said heated vat means for heating liquid circulating through said supply of heated asphalt;
   c. sand means for providing a supply of sand;
   d. perlite means for providing a supply of perlite;
   e. chopped-glass means for providing a supply of chopped glass fibers;
   f. color means for providing a supply of color pigment;
   g. mixer means for hot-mixing shake ingredients homogeneously to provide shake material;
   h. asphalt pipe means for transporting said heated asphalt from said heated vat means to said mixer means;
   i. liquid pipe means for transporting said heated liquid from said liquid heating means to said mixer means to circulate said heated liquid through said mixer means to maintain heat in said mixer means;
   j. perlite transport means for transporting perlite from said perlite means to said mixer means;
   k. chopped-glass transport means for transporting chopped glass from said chopped-glass means to said mixer means;
   l. color-pigment transport means for transporting color pigment from said color means to said mixer means;
   m. composition means for controlling within desired ranges the composition of shake ingredients to be mixed by said mixer means,
      i. said composition means controlling the following shake ingredients within the following percentage ranges, by volume: asphalt, 70%–80%; perlite, 15%–25%; chopped glass fibers 3%–10%; color pigment 5%–7%;
   n. conveyor-belt means for providing a conveyor belt for continuous shake manufacture;
   o. first sand spreader means for spreading a thin layer of sand directly on said conveyor belt as a base for shake material;
   p. first sand transport means for transporting sand from said sand means to said first sand spreader means;
   q. extruder means for receiving said shake material from said mixer means and for extruding a shake-material layer onto said conveyor belt,
      i. said extruder means including extruder nozzle means elongated substantially parallel to said conveyor belt,
      ii. said extruder nozzle means including guillotine means for providing desired dimensional control for extruding said shake material layer tapered in thickness in the direction of the width of said conveyor belt;
   r. extruder cooling means for cooling said shake material in said extruder means;
   s. second sand spreader means for spreading a thin layer of sand onto the top of said shake-material layer;
   t. second sand transport means for transporting sand from said sand means to said second sand spreader means;
   u. shake cooling means for cooling said shake material layer;
   v. conveyor-belt narrowing means for setting the effective width of said conveyor belt to match the width of said extruded shake material layer;
   w. shake embossing means for embossing the top of said shake material layer,
      i. said shake embossing means comprising embossing drum means controllably angled from horizontal to match any said taper of said shake material layer,
      ii. said shake embossing means comprising two embossing stations along said conveyor belt and means to variably control the distance between said stations to provide varying embossing patterns on said shake material layer; and
   x. shake cutting means comprising a cutting station along said conveyor belt for cutting said shake material layer into shakes of controllably varying widths.

5. In a method for the continuous manufacture of roofing shakes, the steps of:
   a. providing a supply of thermoplastic material;
   b. heating said thermoplastic material to a temperature of about 350–400 degrees Fahrenheit;
   c. providing selected other shake ingredients;

d. hot-mixing said selected other shake ingredients with said heated thermoplastic material at a temperature of about 300–350 degrees Fahrenheit to provide heated shake material;

e. providing conveyor-belt means for carrying said heated shake material;

f. continuously extruding said heated shake material as a shake material layer onto said conveyor-belt means at a temperature of at least about 240 degrees Fahrenheit and under an extrusion pressure of from about 20 psi to about 50 psi when being continuously extruded onto said conveyor-belt means;

g. providing at least two shake embossing means located along said conveyor-belt means for embossing a top surface portion of said shake material layer to provide varying embossing patterns on said shake material layer;

h. providing means to variably control the location of at least one of said shake embossing means along said conveyor-belt means; and i. cutting said shake material layer to provide roofing shakes.

6. The method of claim 5 wherein the step of providing said thermoplastic material further comprises the step of providing asphalt.

7. The method of claim 6 wherein the step of providing said selected other shake ingredients further comprises the step of providing perlite and chopped glass fibers.

8. The method of claim 7 wherein the step of hot-mixing said selected other shake ingredients with said heated thermoplastic material further comprises the step of providing the following percentage ranges, by volume: asphalt, 70%–80%; perlite, 15%–25%; chopped glass fibers, 3%–10%.

* * * * *